US 6,649,273 B2

(12) United States Patent
Iwato et al.

(10) Patent No.: US 6,649,273 B2
(45) Date of Patent: Nov. 18, 2003

(54) EMULSION AND COATED PRODUCT THEREOF

(75) Inventors: Satoko Iwato, Tokyo (JP); Mureo Kaku, Tochigi (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/956,667

(22) Filed: Sep. 20, 2001

(65) Prior Publication Data

US 2003/0059624 A1 Mar. 27, 2003

(30) Foreign Application Priority Data

Oct. 6, 2000 (JP) ........................................ 2000-308257

(51) Int. Cl.⁷ ............................ B32B 15/00; C08L 83/00
(52) U.S. Cl. ........................ 428/448; 428/447; 428/450; 528/30; 528/38; 528/42; 524/800; 524/837
(58) Field of Search ................................ 524/800, 837; 528/30, 38, 42; 428/429, 447, 448, 450

(56) References Cited

U.S. PATENT DOCUMENTS

| 4,648,904 A | | 3/1987 | DePasquale et al. | |
|---|---|---|---|---|
| 4,757,106 A | | 7/1988 | Mayer et al. | |
| 4,990,377 A | | 2/1991 | Wilson | |
| 5,196,054 A | | 3/1993 | Schmuck et al. | |
| 5,274,159 A | * | 12/1993 | Pellerite et al. | 252/8.62 |
| 5,442,011 A | | 8/1995 | Halling | |
| 5,547,711 A | | 8/1996 | Kirchmeyer et al. | |
| 5,550,184 A | | 8/1996 | Halling | |
| 5,644,014 A | | 7/1997 | Schmidt et al. | |
| 5,739,369 A | * | 4/1998 | Matsumura et al. | 106/13 |
| 5,883,185 A | * | 3/1999 | Matsumura et al. | 524/838 |

FOREIGN PATENT DOCUMENTS

| EP | 0 748 357 B1 | 6/1999 |
|---|---|---|
| JP | Hei11-181355 A | 7/1999 |
| WO | WO 99 29636 A1 | 6/1999 |

* cited by examiner

Primary Examiner—Robert Dawson
Assistant Examiner—Marc Zimmer

(57) ABSTRACT

A substantially aqueous emulsion and a coated product made with the emulsion are disclosed. The emulsion comprises, or is produced by combining, at least one fluorocarbon silane, a hydrolyzed product of the fluorocarbon silane, or combinations thereof; a silicon-containing compound; and a surfactant. The coated product can comprise a substrate, an undercoat layer, and an emulsion layer.

36 Claims, No Drawings

EMULSION AND COATED PRODUCT THEREOF

FIELD OF THE INVENTION

The present invention relates to a substantially aqueous emulsion comprising a fluorocarbon silane or hydrolyzate thereof, or both; to a composition or product comprising the emulsion; and to a heat-resistant and/or water-repellent coated product comprising the composition.

BACKGROUND OF THE INVENTION

All trade names or trademarks are shown in capital letters.

U.S. Pat. No. 5,550,184 discloses an emulsion containing a fluorocarbon silane hydrolyzed product and a surfactant for emulsifying the hydrolyzed product that does not require a special heat treatment and can provide the water repellency to the base material.

Japanese Kokai Patent Application Hei 11[1999]-181355 discloses an emulsion containing fluorocarbon silane hydrolyzed product, surfactant for emulsifying the hydrolyzed product, and specific silicate, in which pH is adjusted to 7 or more. A characteristics is that it can maintain an excellent water repellency even under a high-temperature condition, that is, heat resistance and water repellency can be provided to a base material.

Japanese Kokai Patent Application Hei 11[1999]-181355 disclose an emulsion containing a hydrolyzed product of a fluorocarbon silane emulsified with a specific nonionic surfactant and a specific silicate, and an emulsion in which pH is adjusted to 4 or more. The emulsion exhibits heat resistance and water repellency.

However, a coated layer containing these emulsions is not as durable as one skilled in the art would desire. Additionally, though these emulsions exhibit water-repellency characteristics, they do not exhibit oil-repellent property. For example, glass window of oven, range, or toaster can be coated with a layer formed by an emulsion having good water repellency at high temperature, but it has a poor oil-stain resistance. It is also highly desirable to develop an emulsion that can exhibit both water-repellent and oil-repellent properties for a variety of applications.

Therefore, there is an increasing need to develop a composition containing the emulsion for coating on glass windows of, for example, oven range and toaster as well as precision products related to automobiles. Also desired is an improved heat resistance, water repellency, and durability of the layer coated on the glass.

SUMMARY OF THE INVENTION

A product or composition comprises a substantially aqueous emulsion, which comprises, or is produced by combining, a fluorocarbon silane or hydrolyzate thereof; a surfactant, a silicon-containing compound, and optionally a film-forming agent wherein the film-forming agent is silicon dioxide, titanium dioxide, zirconium dioxide, organoalkoxysilane, polysilazane, or combinations of two or more thereof.

A product comprises, or is produced by combining, a substrate, an emulsion, and optionally an undercoat layer between the substrate and the emulsion wherein the emulsion comprises or is produced by combining a fluorocarbon silane or hydrolyzate thereof, a surfactant, and a silicon-containing compound; the silicon-containing compound is silicate, organoalkoxysilane, aminosilane, epoxysilane, mercaptosilane, or combinations of two or more thereof; and the undercoat layer comprises or is produced from at least one film-forming agent, which is silicon dioxide, titanium dioxide, zirconium dioxide, organoalkoxysilane, polysilazane, or combinations of two or more thereof.

DETAILED DESCRIPTION OF THE INVENTION

The term "hydrolyzate" is a hydrolyzed product of a fluorocarbon silane. The fluorocarbon silane can have the structure of $R_f$—$(CH_2)_p$—$Si(-(O-CH_2CH_2)_n$—$OR')_3$; $R_f$ is a perfluoroalkyl group having 3 to 18 carbon atoms or a mixture of perfluoroalkyl groups having 3–18 carbon atoms; each R' can be the same or different and is independently an alkyl group having 1 to 3 carbon atoms; p=1–4 and n=2–10, all inclusive. When p and n are each 2, the fluorocarbon is preferably a perfluoroalkylethyl tris(2-(2-methoxyethoxy)ethoxy)silane, and when p is 2 and n is 3, it is preferably a perfluoroalkylethyl tris(2-(2-(2-methoxyethoxy)ethoxy)ethoxy)silane. Such a fluorocarbon silane can be manufactured by any well-known method and commercially available. If two or more fluorocarbon silanes are used, they are generally mixed together.

The silicon-containing compound can be any silicon compound that is polymerizable and can produce an emulsion having the desired characteristics disclosed herein. The silicon compound can be copolymerized with the fluorocarbon silane hydrolyzed product to improve heat resistance and water repellency of the emulsion and the coating layer containing the emulsion.

The preferred silicon compounds include, but are not limited to, silicate, organoalkoxysilane compound, aminosilane compound, epoxysilane compound, mercaptosilane compound, and combinations of two or more thereof.

A preferred silicate can have the structure of Si—$R_4$; R is at least one organic radical selected from a group consisting of $OCH_3$, $OCH_2CH_3$, $(OCH_2CH_2)_mOCH_3$, and m=1–10. The more preferred silicate is $Si((OCH_2CH_2)_mOCH_3)_4$ where m=1–3 for it is water soluble. The most preferred silicate is Si—$((OCH_2CH_2)_2OCH_3)_4$.

A preferred organoalkoxysilane can have the structure of $R^1_w Si(OR^2)_{4-w}$; $R^1$ and $R^2$ are each independently one or more alkyl groups having 1–5 carbons; and w is a number from 1 to 3, inclusive. The most preferred organoalkoxysilane is organomethoxysilane.

A preferred aminosilane, epoxysilane, or mercaptosilane can have the formula of $R^3 R^4_x SiR^5_y (OR^6)_{3-(x+y)}$; $R^3$ is a radical containing amino group, epoxy group, glycidoxy group, thiol group, or combinations of two or more thereof; $R^4$, $R^5$, and $R^6$ can be the same or different and are each independently an alkyl group having 1–5 carbons or a mixture of the alkyl groups; x=0–1; y=0–1; and x+y≦2. When $R^3$ is an amino group, $R^4$ can also be substituted by an amino group.

Specific examples of preferred aminosilane compounds include, but are not limited to, N-(2-aminoethyl) 3-aminopropylmethyl dimethoxysilane, N-(2-aminoethyl) 3-aminopropyl trimethoxysilane, 3-aminopropyl triethoxysilane, and combinations of two or more thereof.

Specific examples of preferred epoxysilane compounds include, but are not limited to, 3-glycidoxypropyl trimethoxysilane, 3-glycidoxypropyl methyldimethoxysilane, and combinations thereof.

Specific examples of preferred mercaptosilane compound includes, but is not limited to, 3-mercaptopropyl trimethoxysilane.

When oil resistance and stain resistance are desired along with the heat resistance and the water repellency in the coated product, an organoalkoxysilane is preferable among the silicon compounds.

The silicon compound can be used at any amount effective to produce an emulsion having desired heat resistance and water repellency. Generally the mole ratio of a silicon compound to of the fluorocarbon silane or its hydrolyzed product can be in the range of from about 0.3:1 to about 10:1, preferably 0.3:1 to 5:1, and more preferably 0.4:1 to 2:1.

Any surfactant that can emulsify a fluorocarbon silane or its hydrolysis product can be used. The surfactant generally is a surfactant having an HLB value sufficiently high to inhibit self-condensation of the fluorocarbon silane hydrolysis product. The term "HLB" refers to the HLB system published by ICI America's, Inc., Wilmington, Del.; Adamson, A. W., "Physical Chemistry of Surfaces", $4^{th}$ edition, John Wily & Sons, New York, 1982). The surfactant can be anionic, cationic, nonionic, amphoteric, or combinations thereof. The preferred surfactants are those with HLB values greater than 12, more preferably greater than 16. Generally, the lower HLB value the surfactant is, the larger amount of the surfactant is required to stabilize the emulsion. Two or more miscible surfactants generally can also be combined or mixed for use as long as they have HLB values sufficiently high to inhibit self-condensation of the fluorocarbon silane or its hydrolyzate products. Two or more kinds of surfactants that are compatible can also be used by mixing.

The HLB value of a nonionic surfactant can be determined by calculation with a formula, among others, originated by Griffin of Atlas Co. (now ICI America) in the U.S. In the case of anionic or cationic surfactant, a method for determination by calculation of the HLB value is not available to date. Nevertheless, paying attention to the fact that changes in emulsification characteristics are sensitive to changes in the HLB value, Atlas Company established and published a method for the experimental determination of the HLB value by an emulsification experiment on standard oil. Companies other than Atlas have also established methods for experimental determination of HLB value. However, it can be clarified by the adoption of any experimental method that the HLB value of the anionic type or the cationic type is greater than 16.

Examples of nonionic surfactants include, but are not limited to, $R_f'$—$CH_2CH_2$—O—$(CH_2CH_2O)_{11}$—H, $C_9H_{19}$—$C_6H_4$—O—$(CH_2CH_2O)_{50}$—H, other nonionic surfactants, and combinations thereof. Examples of cationic surfactants include, but are not limited to $R_f'$—$CH_2CH_2SCH_2CH(OH)CH_2N(CH_3)_3^+Cl^-$, other cationic surfactants, and combinations thereof. Examples of anionic surfactants include, but are not limited to, $C_{12}H_{25}(OCH_2CH_2)_4OSO_3^-NH_4^+$, $C_{12}H_{27}$—$C_6H_4$—$SO_3^-Na^+$, other anionic surfactants, and combinations or two or more thereof. In each of the formulae, $R_f'$ is a perfluoroalkyl group generally having about 3–18 carbon atoms. The preferred surfactants are nonionic surfactants having polyethylene glycol in the molecular chain.

The quantity of the fluorocarbon silane or its hydrolysis product in the aqueous emulsion can be any effective amount to produce desired heat resistance and water repellency. Generally, it can be about 0.1 to about 30 weight %, preferably 2 to 20 weight %, and more preferably 7 to 15 weight % based on the total weight of the emulsion.

The weight ratio of the fluorocarbon silane to the surfactant can be any ratio that can exhibit the desired emulsion property and can be about 1:1 to about 10:1, preferably 5:1 to 2:1, and more preferably 10:3 to 10:4.

The pH of the substantially aqueous emulsion can be adjusted to either 4.5 or lower, or 7 or higher. Generally an acid such as phosphoric acid, hydrochloric acid, sulfuric acid, nitric acid, acetic acid, or formic acid can be used to adjust the pH to 4.5 or lower. Phosphoric acid is preferred because a coating layer formed by spreading the emulsion of which the pH is adjusted with phosphoric acid can prolong the heat resistance and the water repellency.

A basic material such as ammonia, pyridine, and sodium hydroxide can be used to adjust the pH to 7 or higher.

The aqueous emulsion can include ordinary additives such as pigment, sterilizer, ultraviolet absorbent, and antioxidant in the range where they have no influence on the stability of the emulsion and the heat resistance and water repellency of the emulsion or a coating layer containing the emulsion.

Any means known to one skilled in the art can be used to produce the emulsion disclosed herein. However, it is preferred to contact or dissolve a surfactant in water followed by adding a fluorocarbon silane, adding any above-disclosed additive(s) as desired or needed, adjusting its pH as desired, and adding a silicon-containing compound to it.

Also, in order to suppress the self-condensation of the fluorocarbon silane and to maintain it in a hydrolyzed state, it is preferable to add the fluorocarbon silane after dissolving the surfactant. It is also preferred to slowly add a fluorocarbon silane while stirring by any ordinary stirring means known to one skilled in the art.

The undercoat layer can be formed by applying such as, for example, spreading or spraying an undercoat solution onto the base material followed by drying by any means known to one skilled in the art. The undercoat solution can contain at least one film-forming agent such as silicon dioxide, titanium dioxide, zirconium dioxide, organoalkoxysilane, polysilazane, and combinations of two or more thereof.

According to the invention, a heat-resistant and water-repellent coated product is also provided. Generally it is a substrate or base material having thereon a coated layer comprising the emulsion. The coated layer is on the surface of the substrate. The term "substrate" is exchangeable with "base material".

The substrate can be any material. Because a heat-resistant and water-repellent coat layer is formed on the surface of the substrate, an excellent heat resistance and water repellency can be prolonged. Suitable substrates include, but are not limited to, metal plate such as aluminum and stainless steel, glass plate, ceramic tile, brick, concrete, wood, masonry, fiber, leather, plastics, and stone.

The surface on which the coating layer is formed is determined according to the shape and usage of the base material. For example, in a plate-shaped base material, the coating layer can be formed on one surface or both surfaces. In a metal part, the coating layer can be formed on the entire surface.

In the invention, an undercoat layer can be formed between the substrate and the emulsion layer. After forming the undercoat layer, an emulsion disclosed above can be applied to, such as spread on, the undercoat layer, so that the heat resistance and the water repellency can be prolonged. The undercoat layer can be one or more layers.

The undercoat layer can be formed by applying such as, for example, spreading or spraying an undercoat solution onto the base material followed by drying by any means known to one skilled in the art. The undercoat layer can comprise or is produced from a solution containing at least one film-forming agent such as silicon dioxide, titanium dioxide, zirconium dioxide, organoalkoxysilane, polysilazane, and combinations of two or more thereof. The film-forming agent can be the same as that disclosed above.

A solvent can be used in the preparation of the undercoat solution. A suitable solvent includes, but is not limited to, toluene, xylene, hexane, heptane, butyl ether, butyl acetate, acetone, and combinations of two or more thereof. The concentration of the film-forming agent in the solution can be in the range of from about 1 to about 100 weight % depending on the desired thickness of the undercoat layer, the type of film-forming agent used. The general concentration of the film-forming agent in the solution can be in the range of from about 10 to about 50 weight %.

The solution can be applied onto the base material by any known method such as dipping method, spray method, spin-coating method, and roll-coating method. Because it is often in demand that the undercoat layer be able to be formed on the glass base material without damaging the transparency, the dipping method is preferred to maintain the transparency.

Heating may also be applied to accelerate the drying process. Usually, the drying is carried out in a temperature range of 100–350° C. for 5 minutes to 24 hours.

The coating layer of the substantially aqueous emulsion can be formed on the undercoat layer using the same method disclosed above. The above-disclosure of the emulsion is incorporated herein for the interest of brevity.

If desired or necessary, the base material on which the aqueous emulsion is spread can be washed with water after drying to remove the remaining surfactant.

EXAMPLES

The following examples are provided to further illustrate the invention and are not to be construed as to unduly limit the scope of the invention. The components used are as follows.

As a polysilazane solution, PERCUMYL D (($C_6H_5$—C($CH_3)_2$—O—)$_2$) initiator made by Nippon Oil and Fats Co., Ltd. (Japan), at 1 part by weight was used relative to CERASET SN inorganic high-molecular substance made by Lanxide Performance Materials, Inc, (Japan), dissolved in toluene, and mixed. The concentration of the inorganic high-molecular substance in the solution was 10 weight %. CERASET SN has the formula of

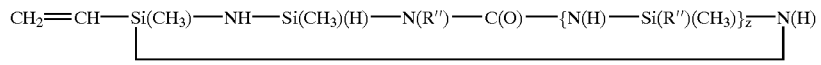

where R" is independently H or CH=$CH_2$ and z=1–20.

As a silicon dioxide solution, ATOLON NSi-500 was used as it was. As a titanium dioxide solution, ATOLON NTi-500 was used as it was. As a zirconium dioxide solution, ATOLON NZr-500 was used as it was. All ATOLON products are made by Nippon Soda Co., Ltd.

A fluorocarbon, which was a perfluoroalkyl mixture represented by $R_f$—$(CH_2)_2$—Si(—(O—$CH_2CH_2)_2$—$OCH_3)_3$, was used. $R_f$ is F($CF_2)_k$(k=6 1–2 wt %; k=8, 62–64 wt %; k=10, 23–30 wt %; k=12–18, 2–6 wt %).

A surfactant represented by $R_f'$—$CH_2CH_2$—O—$(CH_2CH_2O)_{11}$—H was used, and $R_f'$ is a nonionic surfactant which is a perfluoroalkyl group having 3–18 carbon atoms. The silicate used was a tetrakis(2-(2-methoxyethoxy)ethyl) silicate (Si (DEGM)$_4$). The organoalkoxysilane used was $CH_3Si(OCH_3)_3$.

Examples 1–5

The surfactant at 30 parts by weight relative to the fluorocarbon silane at 100 parts by weight was dissolved in water, and 10 wt % fluorocarbon silane was slowly added based on the total weight of the aqueous emulsion while stirring by an ordinary stirring technique (magnetic bar). The self-condensation of the fluorocarbon silane was suppressed, and its hydrolyzed state was maintained. A pH adjuster shown in Table I was added while measuring pH of the emulsion by a pH meter. When a prescribed pH shown in Table I was obtained, the addition was finished. Furthermore, the silicon compound shown in Table I was added so that the mole ratio of the silicon compound to the fluorocarbon silane was 0.45, and it was then stirred for 2 to 4 hours to produce an aqueous emulsion.

The polysilazane solution was spread on an aluminum plate (JIS1100 of 2.5 cm×5.0 cm, a thickness of 1 mm) and dried, so that an undercoat layer was formed. The polysilazane solution was spread by a dip coating. In the dip coating, the specimens were dropped at a speed of 300 mm/min into the polysilazane solution, and its state was maintained for 5 minutes. Then, the specimens were pulled up at a speed of 50 mm/min. After spreading, drying was carried out at 300° C. for 60 minutes.

The aqueous emulsion was spread on the undercoat layer and dried, so that specimens were prepared. The aqueous emulsion was also spread by the dip coating. In the dip coating, the specimens were dropped at a speed of 300 mm/min into the aqueous emulsion, and its state was maintained for 5 minutes. Then, the specimens were pulled up at a speed of 50 mm/min. After spreading, drying was carried out at 200° C. for 60 minutes.

An aliquot (2 µl) of pure water was dropped on the surface of the coating layer of the specimens obtained, and the contact angle was measured by a contact angle meter (made by Kyowa Kaimen Kagaku K. K.) as shown in Table I.

The specimens were put into an oven at 370° C., and after a lapse of the time shown in Table I, the contact angle was similarly measured as shown in Table I.

Comparative Examples 1–5

In Comparative Examples 1–5, similar to Example 1 except for directly forming the coating layer on the base material without installing the undercoat layer, specimens were prepared and similarly subjected to a water repellency test shown in Table I.

In Table I, the silicon compound used was Si(DEGM)$_4$ (Examples 1, 2, and 3; Comparative Examples 1, 2, and 3), organomethoxysilane (Examples 4 and Comparative Examples 4), and aminoalkylalkoxysilane (Examples 5 and Comparative Examples 5).

TABLE I

| Example | 1 | 2 | 3 | 4 | 5 | 1[a] | 2[a] | 3[a] | 4[a] | 5[a] |
|---|---|---|---|---|---|---|---|---|---|---|
| pH adjuster[b] | HCl | NH$_3$ | P | P | P | HCl | NH$_3$ | P | P | P |
| pH emulsion | 2.2 | 10.8 | 2.2 | 2.2 | 2.2 | 2.2 | 10.8 | 2.2 | 2.2 | 2.2 |
| Angle-0[c] | 120 | 115 | 120 | 120 | 120 | 119 | 119 | 120 | 120 | 119 |
| Angle-40[d] | 93 | 120 | 120 | 127 | 112 | <20 | 83 | 103 | 100 | 65 |
| Angle-50[e] | 74 | 117 | 119 | 126 | 109 | — | 57 | 80 | 84 | — |
| Angle-65[f] | — | 110 | 114 | 121 | 101 | — | — | — | — | — |

[a]Comparative Example
[b]P denotes phosphoric acid
[c]Initial water repellency angle (°)
[d]Water repellency angel (°) after a lapse of 40 hours at 370° C.
[e]Water repellency angle (°) after a lapse of 50 hours at 370° C.
[f]Water repellency angle (°) after a lapse of 65 hours at 370° C.

Comparing Examples 1–5 and Comparative Examples 1–5, it is clear that the heat resistance and the water repellency were improved significantly by installing the undercoat layer of polysilazane. In Example 4 in which organomethoxysilane was the silane compound and the pH of the emulsion was adjusted with phosphoric acid, the water repellency angle essentially remained unchanged even after 65 hours at 370° C. demonstrating the durability of the heat-resistant and water-repellent coating layer.

Examples 6–8

The surfactant at 30 parts by weight relative to the fluorocarbon silane at 100 parts by weight was dissolved in water, and 10 weight % fluorocarbon silane was slowly added based on the total weight of the aqueous emulsion while stirring by an ordinary stirring technique. The self-condensation of the fluorocarbon silane was suppressed, and its hydrolyzed state was maintained. While measuring pH of the emulsion by a pH meter, phosphoric acid was added, and the addition was finished when a prescribed pH shown in Table II was obtained. Furthermore, an organomethoxysilane was added so that the mole ratio of the silicon compound to the fluorocarbon silane might be 0.45, and it was then stirred for 2–4 hours to produce an aqueous emulsion.

The film-forming agent solution shown in Table II was spread onto an aluminum plate (JIS1100 of 2.5 cm×5.0 cm, thickness 1 mm) and dried to produce an undercoat layer. The solution was spread by a dip coating. In the dip coating, the specimens were dropped at a speed of 300 mm/min into the solution, and its state was maintained for 5 min. Then, the specimens were pulled up at a speed of 500 mm/min. After spreading, drying was carried out at room temperature for 1 hour, and baking was carried out at 300° C. for 60 min.

The aqueous emulsion was spread on the undercoat layer and dried as disclosed in Examples 1–5 to produce coated layers. The contact angle was measured as above and shown in Table II.

TABLE II

| Example | Example 6 | Example 7 | Example 8 |
|---|---|---|---|
| pH adjuster | Phosphoric acid | Phosphoric acid | Phosphoric acid |
| pH of aqueous emulsion | 2.2 | 2.2 | 2.2 |
| Undercoat layer | SiO$_2$ | TiO$_2$ | ZrO$_2$ |
| Angle-0[c] | 118 | 119 | 119 |
| Angle-40[d] | 116 | 111 | 110 |
| Angle-50[e] | 110 | 106 | 102 |
| Angle-65[f] | 51 | 98 | 96 |

[c,d,e,f]See Table I footnotes

Comparing Examples 6–8 and Comparative Example 4, it can be seen that, when silicon dioxide, titanium dioxide, or zirconium dioxide were used as undercoat layer, excellent durability under a high-temperature condition was obtained.

Examples 9–11

The surfactant at 30 parts by weight relative to the fluorocarbon silane at 100 parts by weight was dissolved in water, and 10 wt % fluorocarbon silane was slowly added based on the total weight of the aqueous emulsion while stirring by an ordinary stirring technique. The self-condensation of the fluorocarbon silane was suppressed, and its hydrolyzed state was maintained. While measuring pH of the emulsion by a pH meter, ammonia was added, and the addition was finished when a prescribed pH shown in Table III was obtained. Furthermore, a silicate (Si(DEGM)$_4$), was added so that the mole ratio of the silicon compound to the fluorocarbon silane might be 0.45, and it was then stirred for 2–4 hours, so that an aqueous emulsion was prepared.

The undercoat layers and coated layers containing the emulsion were produced as disclosed in Examples 6–8, followed by measurement of water repellency angle shown in Table III.

TABLE III

| Example | Example 9 | Example 10 | Example 11 |
|---|---|---|---|
| pH adjuster | Ammonia | Ammonia | Ammonia |
| pH of aqueous emulsion | 10.8 | 10.8 | 10.8 |
| Undercoat layer | SiO$_2$ | TiO$_2$ | ZrO$_2$ |
| Angle-0[c] | 118 | 118 | 118 |
| Angle-40[d] | 110 | 124 | 120 |
| Angle-50[e] | 95 | 122 | 116 |
| Angle-65[f] | 56 | 119 | 110 |

[c,d,e,f]See Table I footnotes

As shown in the table, the coated layers of Examples 9–11 had much better durability under a high-temperature condition than that of Comparative Example 2, which did not contain an undercoat layer.

As also shown in Examples 2 and 9–11, it is apparent that when pH of the silicate was adjusted with ammonia and titanium dioxide was used as the undercoat layer, the durability of the heat-resistant and water-repellent coating layer was markedly improved.

What is claimed is:

1. A product comprising a substantially aqueous emulsion, which comprises, or is produced by combining, a fluorocarbon silane or hydrolyzate thereof, a surfactant, and a silicon-containing compound wherein said fluorocarbon silane has the formula of $R_f\text{—}(CH_2)_p\text{—}Si\{\text{—}(O\text{—}CH_2CH_2)_n\text{—}OR'\}_3$, $R_f$ is a $C_{3-18}$ perfluoroalkyl group or combinations thereof, each R' is independently a $C_{1-3}$ alkyl groups or combinations thereof, p is 1 to 4, inclusive, and n is 2 to 10, inclusive; said surfactant has a HLB value greater than 12; and said silicon-containing compound is an aminosilane, an epoxysilane, a mercaptosilane, or combinations of two or more thereof.

2. A product according to claim 1 wherein said fluorocarbon silane is a perfluoroalkylethyl tris(2-(2-methoxyethoxy)ethoxy)silane, a perfluoroalkylethyl tris(2-(2-(2-methoxyethoxy)ethoxy)silane or combinations thereof.

3. A product according to claim 2 wherein said fluorocarbon silane is $R_f\text{—}(CH_2)_2\text{—}Si(\text{—}(O\text{—}CH_2CH_2)_2\text{—}OCH_3)_3$; $R_f$ is $F(CF_2)_k$; and k=6–18.

4. A product according to claim 1 wherein said silicon-containing compound has the formula of $R^3R^4{}_xSiR^5{}_y(OR^6)_{3-(x+y)}$; $R^3$ is a radical containing selected from the group consisting of amino group, glycidoxy group, epoxy group, and thiol group, and combinations of two or more thereof; $R^4$, $R^5$, and $R^6$ are each independently an alkyl group having 1–5 carbons or a mixture of alkyl groups; x=0–1; y=0–1; and x+y≦2.

5. A product according to claim 2 wherein said silicon-containing compound has the formula of $R^3R^4{}_xSiR^5{}_y(OR^6)_{3-(x+y)}$; $R^3$ is a radical containing selected from the group consisting of amino group, epoxy group, glycidoxy group, and thiol group, and combinations of two or more thereof; $R^4$, $R^5$, and $R^6$ are each independently an alkyl group having 1–5 carbons or a mixture of alkyl groups; x=0–1; y=0–1; and x+y≦2.

6. A product according to claim 3 wherein said silicon-containing compound is N-(2-aminoethyl)3-aminopropylmethyl dimethoxysilane, N-(2-aminoethyl)3-aminopropyl trimethoxysilane, 3-aminopropyl triethoxysilane, 3-glycidoxypropyl trimethoxysilane, 3-glycidoxypropyl methyldimethoxysilane, 3-mercaptopropyl trimethoxysilane, or combinations of two or more thereof.

7. A product according to claim 1 wherein said surfactant has a HLB value greater than 16.

8. A product according to claim 7 wherein said surfactants is $R_f'\text{—}CH_2CH_2\text{—}O\text{—}(CH_2CH_2O)_{11}\text{—}H$, $C_9H_{19}\text{—}C_6H_4\text{—}O\text{—}(CH_2CH_2O)_{50}\text{—}H$, $R_f'\text{—}CH_2CH_2SCH_2CH(OH)CH_2N(CH_3)_3{}^+Cl^-$, $C_{12}H_{25}(OCH_2CH_2)_4OSO_3{}^-NH_4{}^+$, $C_{12}H_{27}\text{—}C_6H_4\text{—}SO_3{}^-Na^+$, or combinations of two or more thereof; and $R_f'$ is a perfluoroalkyl group having about 3 to about 18 carbon atoms.

9. A product according to claim 3 wherein said surfactants is $R_f'\text{—}CH_2CH_2\text{—}O\text{—}(CH_2CH_2O)_{11}\text{—}H$, $C_9H_{19}\text{—}C_6H_4\text{—}O\text{—}(CH_2CH_2O)_{50}\text{—}H$, $R_f'\text{—}CH_2CH_2SCH_2CH(OH)CH_2N(CH_3)_3{}^+Cl^-$, $C_{12}H_{25}(OCH_2CH_2)_4OSO_3{}^-NH_4{}^+$, $C_{12}H_{27}\text{—}C_6H_4\text{—}SO_3{}^-Na^-$, or combinations of two or more thereof; and $R_f'$ is a perfluoroalkyl group having about 3 to about 18 carbon atoms.

10. A product according to claim 6 wherein said surfactants is $R_f'\text{—}CH_2CH_2\text{—}O\text{—}(CH_2CH_2O)_{11}\text{—}H$, $C_9H_{19}\text{—}C_6H_4\text{—}O\text{—}(CH_2CH_2O)_{50}\text{—}H$, $R_f'\text{—}CH_2CH_2SCH_2CH(OH)CH_2N(CH_3)_3{}^+Cl^-$, $C_{12}H_{25}(OCH_2CH_2)_4OSO_3{}^-NH_4{}^+$, $C_{12}H_{27}\text{—}C_6H_4\text{—}SO_3{}^-Na^+$, or combinations of two or more thereof; and $R_f'$ is a perfluoroalkyl group having about 3 to about 18 carbon atoms.

11. A product comprising a substrate having thereon a substantially aqueous emulsion wherein said substrate is metal, glass, ceramic tile, brick, concrete, wood, masonry, fiber, leather, plastics, or stone and said emulsion is the same as recited in claim 1, 2, 3, 4, 5, 6, 7, 8, 9, or 10.

12. A product according to claim 11 further comprising at least one undercoat layer between said substrate and said emulsion wherein said undercoat layer comprises or is produced from at least one film-forming agent, which is silicon dioxide, titanium dioxide, zirconium dioxide, organoalkoxysilane, polysilazane, or combinations of two or more thereof.

13. A product according to claim 12 wherein said substrate is glass or metal.

14. A product comprising a substantially aqueous emulsion layer, which comprises, or is produced by combining, a fluorocarbon silane or hydrolyzate thereof, a surfactant, and a silicon-containing compound, and a layer comprising film-forming agent wherein said fluorocarbon silane has the formula of $R_f\text{—}(CH_2)_p\text{—}Si\{\text{—}(O\text{—}CH_2CH_2)_n\text{—}OR'\}_3$, $R_f$ is a $C_{3-18}$ perfluoroalkyl group or combinations thereof, each R' is independently a $C_{1-3}$ alkyl groups or combinations thereof, p is 1 to 4, inclusive, and n is 2 to 10, inclusive; and said film-forming agent is silicon dioxide, titanium dioxide, zirconium dioxide, organoalkoxysilane, polysilazane, or combinations of the two or more thereof.

15. A product according to claim 14 wherein said silicon-containing compound is a silicate, an organoalkoxysilane, an aminosilane, a qlycidoxy compound, an epoxysilane, a mercaptosilane, or combinations of two or more thereof.

16. A product according to claim 15 wherein said silicon-containing compound is N-(2-aminoethyl) 3-aminopropylmethyl dimethoxysilane, N-(2-aminoethyl) 3-aminopropyl trimethoxysilane, 3-aminopropyl triethoxysilane, 3-glycidoxypropyl trimethoxysilane, 3-glycidoxypropyl methyldimethoxysilane, 3-mercaptopropyl trimethoxysilane, $CH_3Si(OCH_3)_3$, tetrakis(2-(2-methoxyethoxy)ethoxy)silicate, or combinations of two or more thereof.

17. A product according to claim 16 wherein said surfactants is $R_f'\text{—}CH_2CH_2\text{—}O\text{—}(CH_2CH_2O)_{11}\text{—}H$, $C_9H_{19}\text{—}C_6H_4\text{—}O\text{—}(CH_2CH_2O)_{50}\text{—}H$, $R_f'\text{—}CH_2CH_2SCH_2CH(OH)CH_2N(CH_3)_3{}^+Cl^-$, $C_{12}H_{25}(OCH_2CH_2)_4OSO_3{}^-NH_4{}^+$, $C_{12}H_{27}\text{—}C_6H_4\text{—}SO_3\text{—}Na^+$, or combinations of two or more thereof; and $R_f'$ is a perfluoroalkyl group having about 3 to about 18 carbon atoms.

18. A product according to claim 17 wherein the pH of said emulsion is (1) 4.5 or lower or (2) 7 or higher.

19. A product according to claim 14, 15, 16, 17, or 18 further comprising a substrate having thereon said emulsion wherein said substrate is metal, glass, ceramic tile, brick, concrete, wood, masonry, fiber, leather, plastics, or stone.

20. A product according to claim 18 further comprising at least one undercoat layer between said substrate and said emulsion wherein said undercoat layer comprises or is produced from said film-forming agent, which is silicon dioxide, titanium dioxide, zirconium dioxide, organoalkoxysilane, polysilazane, or combinations of two or more thereof.

21. A product according to claim 20 wherein said substrate is glass or metal.

22. A process comprising contacting a surfactant in water to produce a surfactant-water mixture; combining said surfactant-water mixture with a fluorocarbon silane to produce a silane-surfactant mixture; optionally adjusting the pH of said silane-surfactant mixture to produce a pH-adjusted mixture; combining said silane-surfactant mixture or said pH-adjusted mixture with a polymerizable silicon-containing compound to produce an emulsion; and applying said emulsion to a substrate wherein said surfactant has a HLB value greater 16; said fluorocarbon silane has the formula of $R_f$—$(CH_2)_p$—$Si\{$—$(O$—$CH_2CH_2)_n$—$OR'\}_3$, $R_f$ is a $C_{3-18}$ perfluoroalkyl group or combinations thereof, each R' is independently a $C_{1-3}$ alkyl groups or combinations thereof, p is 1 to 4, inclusive; said silicon-containing compound is a silicate, an organoalkoxysilane, an aminosilane, an epoxysilane, a mercaptosilane, or combinations of two or more thereof; said substrate having coated thereon an undercoat layer; and said undercoat layer comprises or is produced from at least one film-forming agent selected from the group consisting of silicon dioxide, titanium dioxide, zirconium dioxide, organoalkoxysilane, polysilazane, and combinations of two or more thereof.

23. A process according to claim 22 wherein said fluorocarbon silane is a perfluoroalkylethyl tris(2-(2-methoxyethoxy)ethoxy)silane, a perfluoroalkylethyl tris(2-(2-(2-methoxyethoxy)ethoxy)ethoxy)silane, or combinations thereof.

24. A process according to claim 23 wherein said silicon-containing compound has the formula of $R^3R^4_x SiR^5_{y(OR^6)_{3-(x+y)}}$; $R^3$ is a functional group selected from the group consisting of amino group, epoxy group, glycidoxy group, and thiol group, and combinations of two or more thereof; $R^4$, $R^5$, and $R^6$ are each independently an alkyl group having 1–5 carbons or a mixture of alkyl groups; x=0–1; y=0–1; and x+y≦2.

25. A process according to claim 24 wherein said surfactant is
$R_f'$—$CH_2CH_2$—$O$—$(CH_2CH_2O)_{11}$—H, $C_9H_{19}$—$C_6H_4$—$O$—$(CH_2CH_2O)_{50}$—H, $R_f'$—$CH_2CH_2SCH_2CH(OH)CH_2N(CH_3)_3^+Cl^-$, $C_{12}H_{25}(OCH_2CH_2)_4OSO_3^-NH_4^+$, $C_{12}H_{27}$—$C_6H_4$—$SO_3$—$Na^+$, or combinations of two or more thereof; and $R_f'$ is a perfluoroalkyl group having about 3 to about 18 carbon atoms.

26. A process comprising (1) contacting a substrate surface with at least one film-forming agent to produce an undercoated substrate having thereon an undercoat layer; (2) contacting said undercoated substrate with an emulsion wherein said undercoat layer comprises or is produced from at least one film-forming agent selected from the group consisting of silicon dioxide, titanium dioxide, zirconium dioxide, organoalkoxysilane, polysilazane, and combinations of two or more thereof; said emulsion comprises or is produced by combining, a fluorocarbon silane or hydrolyzate thereof, a surfactant, a silicon-containing compound; said fluorocarbon silane has the formula of $R_f$—$(CH_2)_p$—$Si\{$—$(O$—$CH_2CH_2)_n$—$OR'\}_3$, $R_f$ is a $C_{3-18}$ perfluoroalkyl group or combinations thereof, each R' is independently a $C_{1-3}$ alkyl groups or combinations thereof, p is 1 to 4, inclusive, and n is 2 to 10, inclusive; and said substrate is metal, glass, ceramic tile, brick, concrete, wood, masonry, fiber, leather, plastics, or stone.

27. A process according to claim 26 wherein said silicon-containing compound is N-(2-aminoethyl) 3-aminopropylmethyl dimethoxysilane, N-(2-aminoethyl) 3-aminopropyl trimethoxysilane, 3-aminopropyl triethoxysilane, 3-glycidoxypropyl trimethoxysilane, 3-glycidoxypropyl methyldimethoxysilane, is 3-mercaptopropyl trimethoxysilane, or combinations of two or more thereof.

28. A process according to claim 26 wherein said fluorocarbon silane is a perfluoroalkylethyl tris(2-(2-methoxyethoxy)ethoxy)silane, a perfluoroalkylethyl tris(2-(2-(2-methoxyethoxy)ethoxy)ethoxy)silane, or combinations thereof.

29. A process according to claim 28 wherein said silicon-containing compound has the formula of $R^3R^4_x SiR^5_y (OR^6)_{3-(x+y)}$; $R^3$ is a functional group selected from the group consisting of amino group, epoxy group, glycidoxy group, and thiol group, and combinations of two or more thereof; $R^4$, $R^5$, and $R^6$ are each independently an alkyl group having 1–5 carbons or a mixture of alkyl groups; x=0–1; y=0–1; and x+y≦2.

30. A process according to claim 29 wherein said surfactant is $R_f'$—$CH_2CH_2$—$O$—$(CH_2CH_2O)_{11}$—H, $C_9H_{19}$—$C_6H_4$—$O$—$(CH_2CH_2O)_{50}$—H, $R_f'$—$CH_2CH_2SCH_2CH(OH)CH_2N(CH_3)_3^+Cl^-$, $C_{12}H_{25}(OCH_2CH_2)_4OSO_3^-NH_4^+$, $C_{12}H_{27}$—$C_6H_4$—$SO_3$—$Na^+$, or combinations of two or more thereof; and $R_f'$ is a perfluoroalkyl group having about 3 to about 18 carbon atoms.

31. A process according to claim 26 wherein said silicon-containing compound is N-(2-aminoethyl) 3-aminopropylmethyl dimethoxysilane, N-(2-aminoethyl) 3-aminopropyl trimethoxysilane, 3-aminopropyl triethoxysilane, 3-glycidoxypropyl trimethoxysilane, 3-glycidoxypropyl methyldimethoxysilane, is 3-mercaptopropyl trimethoxysilane, or combinations of two or more thereof.

32. A process according to claim 31 wherein said substrate is glass or metal.

33. A product according to claim 1 wherein said fluorocarbon silane is aperfluoroalkylethyl tris(2-(2-methoxyethoxy)ethoxy)silane, a perfluoroalkylethyl tris(2-(2-(2-methoxyethoxy)ethoxy)ethoxy)silane, or combinations thereof.

34. A product according to claim 2 wherein said fluorocarbon silane is $R_f$—$(CH_2)_2$—$Si($—$(O$—$CH_2CH_2)_2$—$OCH_3)_3$; $R_f$ is $F(CF_2)_k$; and k=6–18.

35. A product comprising a substrate having thereon a substantially aqueous emulsion, and optionally at least one film-forming agent wherein said substrate is metal, glass, ceramic tile, brick, concrete, wood, mason , fiber, leather, plastics, or stone and said emulsion is the same as recited in claim 36, 33, or 34; and said film-forming agent is silicon dioxide, titanium dioxide, zirconium dioxide, organoalkoxysilane, polysilazane, or combinations of two or more thereof.

36. A product comprising a substantially aqueous emulsion, which comprises, or is produced by combining, a fluorocarbon silane or hydrolyzate thereof, a surfactant, and a mercaptosilane wherein said fluorocarbon silane has the formula of $R_f$—$(CH_2)_p$—$Si\{$—$(O$—$CH_2CH_2)_n$—$OR'\}_3$, $R_f$ is a $C_{3-18}$ perfluoroalkyl group or combinations thereof, each R' is independently a $C_{1-3}$ alkyl groups or combinations thereof, p is 1 to 4, inclusive, and n is 2 to 10, inclusive.

* * * * *

UNITED STATES PATENT AND TRADEMARK OFFICE
CERTIFICATE OF CORRECTION

PATENT NO.     : 6,649,273 B2
DATED          : November 18, 2003
INVENTOR(S)    : Iwato Satoko and Kaku Mureo It is certified that error appears in the above-identified patent and that said Letters Patent is hereby corrected as shown below:

Column 10,
Line 57, delete "claim 18" and substitute therefor -- claim 19 --

Column 11,
Line 28, delete "$SiR^5_{y(OR^6)_{3-(x+y)}}$;" and substitute therefor -- $SiR^5_y(OR^6)_{3-(x+y)}$; --

Signed and Sealed this

Eleventh Day of May, 2004

JON W. DUDAS
*Acting Director of the United States Patent and Trademark Office*